(12) United States Patent
Zhang et al.

(10) Patent No.: US 12,182,671 B2
(45) Date of Patent: Dec. 31, 2024

(54) OPTIMIZING A MACHINE LEARNING SYSTEM

(71) Applicant: International Business Machines Corporation, Armonk, NY (US)

(72) Inventors: Yunfeng Zhang, Chappaqua, NY (US); Qingzi Liao, White Plains, NY (US); Bhavya Ghai, Stony Brook, NY (US); Klaus Mueller, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1012 days.

(21) Appl. No.: 17/158,578

(22) Filed: Jan. 26, 2021

(65) Prior Publication Data
US 2022/0237504 A1    Jul. 28, 2022

(51) Int. Cl.
*G06N 3/04* (2023.01)
*G06N 5/04* (2023.01)
*G06N 20/00* (2019.01)

(52) U.S. Cl.
CPC .............. *G06N 20/00* (2019.01); *G06N 3/04* (2013.01); *G06N 5/04* (2013.01)

(58) Field of Classification Search
CPC ............ G06N 20/00; G06N 5/04; G06N 3/04; G06N 3/044; G06N 3/0442; G06N 3/045;
(Continued)

(56) References Cited

U.S. PATENT DOCUMENTS 9,058,317 B1    6/2015   Gardner
9,552,549 B1    1/2017   Gong
(Continued)

FOREIGN PATENT DOCUMENTS

| CN | 104850645 A | 8/2015 |
|---|---|---|
| CN | 107247972 A | 10/2017 |
| CN | 106778865 B | 10/2019 |
| CN | 108038853 B | 5/2020 |
| EP | 17247049 A | 11/2006 |
| WO | 2020072871 W | 1/2020 |

OTHER PUBLICATIONS

"Active Learning++: Incorporating Annotator's Rationale using Local Model Explanation"; Bhavya Ghai, Vera Liao, Yunfeng Zhang, and Klaus Mueller; DaSH@KDD, Virtual Conference, Aug. 24, 2020.

(Continued)

*Primary Examiner* — Lut Wong
(74) *Attorney, Agent, or Firm* — Amin, Turocy & Watson, LLP

(57) ABSTRACT

A method optimizes machine learning systems. A computing device accesses a committee of classifiers that have been trained using an initial labeled instance of data from an annotator. The initial labeled instance of data includes annotator-ranked attributes of the data, initial values of the attributes, and an initial prediction label that describes an initial predicted state based on the values. The computing system compares the attributes ranking from the annotator to attributes rankings that are generated by and used by each of the machine learning systems when evaluating one or more instances of unlabeled data that include the attributes, and weights the machine learning systems according to how closely each of the attributes rankings generated by and used by each of the machine learning systems match the attributes ranking from the annotator. The machine learning systems are then optimized based on this matching.

19 Claims, 8 Drawing Sheets

(58) Field of Classification Search
CPC .. G06N 3/0455; G06N 3/06; G06N 3/080895; G06N 3/09; G06N 3/091; G06N 3/092; G06N 3/094; G06N 3/096; G06N 3/098; G06N 3/0985
See application file for complete search history.

(56) References Cited

U.S. PATENT DOCUMENTS

| | | | |
|---|---|---|---|
| 10,366,490 | B2 | 7/2019 | Xu |
| 10,650,280 | B2 | 5/2020 | Cox |
| 11,017,321 | B1* | 5/2021 | Mishra ............... G05B 23/0283 |
| 2006/0224532 | A1* | 10/2006 | Duan ................. G06F 18/2113 706/15 |
| 2008/0103996 | A1* | 5/2008 | Forman ................. G06N 20/00 706/12 |
| 2018/0211120 | A1 | 7/2018 | Smith |
| 2019/0102674 | A1 | 4/2019 | Kwant |
| 2019/0384807 | A1 | 12/2019 | Dernoncourt |
| 2024/0005203 | A1* | 1/2024 | Chandelier .............. G06N 3/04 |

OTHER PUBLICATIONS

Bhavya Ghai, Q Vera Liao, Yunfeng Zhang, Rachel Bellamy, and Klaus Mueller. "Explainable Active Learning (XAL): Toward AI Explanations as Interfaces for Machine Teachers, An Empirical Study of How Local Explanations Impact Annotator Experience". Proceedings of the ACM on Human-Computer Interaction, Article No. 235, Jan. 2021.

Burr Settles. 2009. Active learning literature survey. Technical Report. University of Wisconsin-Madison Department of Computer Sciences.

Hema Raghavan and James Allan. 2007. An interactive algorithm for asking and incorporating feature feedback into support vector machines. In Proceedings of the 30th annual international ACM SIGIR conference on Research and development in information retrieval. 79-86.

Naoki Abe Hiroshi Mamitsuka et al. 1998. Query learning strategies using boosting and bagging. In Machine learning: proceedings of the fifteenth international conference (ICML98), vol. 1. Morgan Kaufmann Pub.

Omar Zaidan, Jason Eisner, and Christine Piatko. 2007. Using Annotator rationales to improve machine learning for text categorization. In Human language technologies 2007: The conference of the North American chapter of the association for computational linguistics; proceedings of the main conference. 260-267.

P. Mell et al., "The NIST Definition of Cloud Computing", National Institute of Standards and Technology, Information Technology Laboratory, Sep. 2011, pp. 1-7.

UCI Machine Learning Repository. 1998. Adult Census Income dataset. (1998).

* cited by examiner

OPTIMIZING A MACHINE LEARNING SYSTEM

STATEMENT REGARDING PRIOR DISCLOSURES BY THE INVENTOR OR A JOINT INVENTOR

The following disclosure is submitted under 35 U.S.C. 102(b)(1)(A):

DISCLOSURE: "Active Learning++: Incorporating Annotator's Rationale using Local Model Explanation"; Bhavya Ghai, Vera Liao, Yunfeng Zhang, and Klaus Mueller; DaSH@KDD, Virtual Conference, Aug. 24, 2020.

DISCLOSURE: "Explainable Active Learning (XAL): An Empirical Study of How Local Explanations Impact Annotator Experience"; Bhavya Ghai, Q Vera Liao, Yunfeng Zhang, Rachel Bellamy, and Klaus Mueller; arXiv preprint arXiv:2001.09219, January, 2021.

BACKGROUND

The present invention relates to the field of machine learning systems. Still more specifically, the present invention relates to the field of optimizing machine learning systems based on optimized rankings of annotator classifications for input data used to identify models having maximum disagreement levels.

Machine learning systems are forms of artificial intelligence used to evaluate instances of data, in order to generate a credible output based on those instances of data. However, the utility of such instances of data is often unknown.

For example, a machine learning system can receive a group of labeled data, but might not know what this labeled data could be used for. That is, the labeled data could be used to describe a particular type of physical equipment, but without identifying that particular type of physical equipment, what problems are or will be experienced by that particular physical device, etc. As such, one or more embodiments of the present invention provide a new and useful solution for addressing this and/or other problems not solved by the prior art.

SUMMARY

In one or more embodiments of the present invention, a method optimizes machine learning systems. A computing device accesses a committee of classifiers. The committee of classifiers is composed of a plurality of machine learning systems that have been trained using an initial labeled instance of data from an annotator. The initial labeled instance of data includes attributes of the data, initial values of the attributes, and an initial prediction label that describes an initial predicted state based on the values.

The computing device receives an attributes ranking from the annotator. The attributes ranking is based on a determination by the annotator of an impact level that each attribute has when generating a prediction label for an instance of data that has the attributes of the initial labeled instance of data. The computing system compares the attributes ranking from the annotator to attributes rankings that are generated by and used by each of the machine learning systems when evaluating one or more instances of unlabeled data that include the attributes.

The computing system weights the machine learning systems according to how closely each of the attributes rankings generated by and used by each of the machine learning systems match the attributes ranking from the annotator, such that the weighting defines weighted machine learning systems.

The computing device inputs one or more subsequent instances of unlabeled data into the weighted machine learning systems to generate subsequent prediction labels for the one or more subsequent instances of unlabeled data, where the unlabeled data comprises the attributes of the data found in the initial labeled instance of data and new values of the attributes.

The computing system utilizes the subsequent prediction labels to further train the plurality of machine learning systems until an accuracy of the committee of classifiers reaches a predefined threshold, such that reaching the predefined threshold defines the committee of classifiers as being trained and optimized to accurately generate prediction labels for future unlabeled incidents of data that have the attributes of the initial incident of data.

The computing system, using the committee of classifiers that has reached the predefined threshold, thereafter assigns prediction labels to incoming unlabeled instances of data.

In one or more embodiments of the present invention, the methods described herein are implemented in a computer program product and/or a computer system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
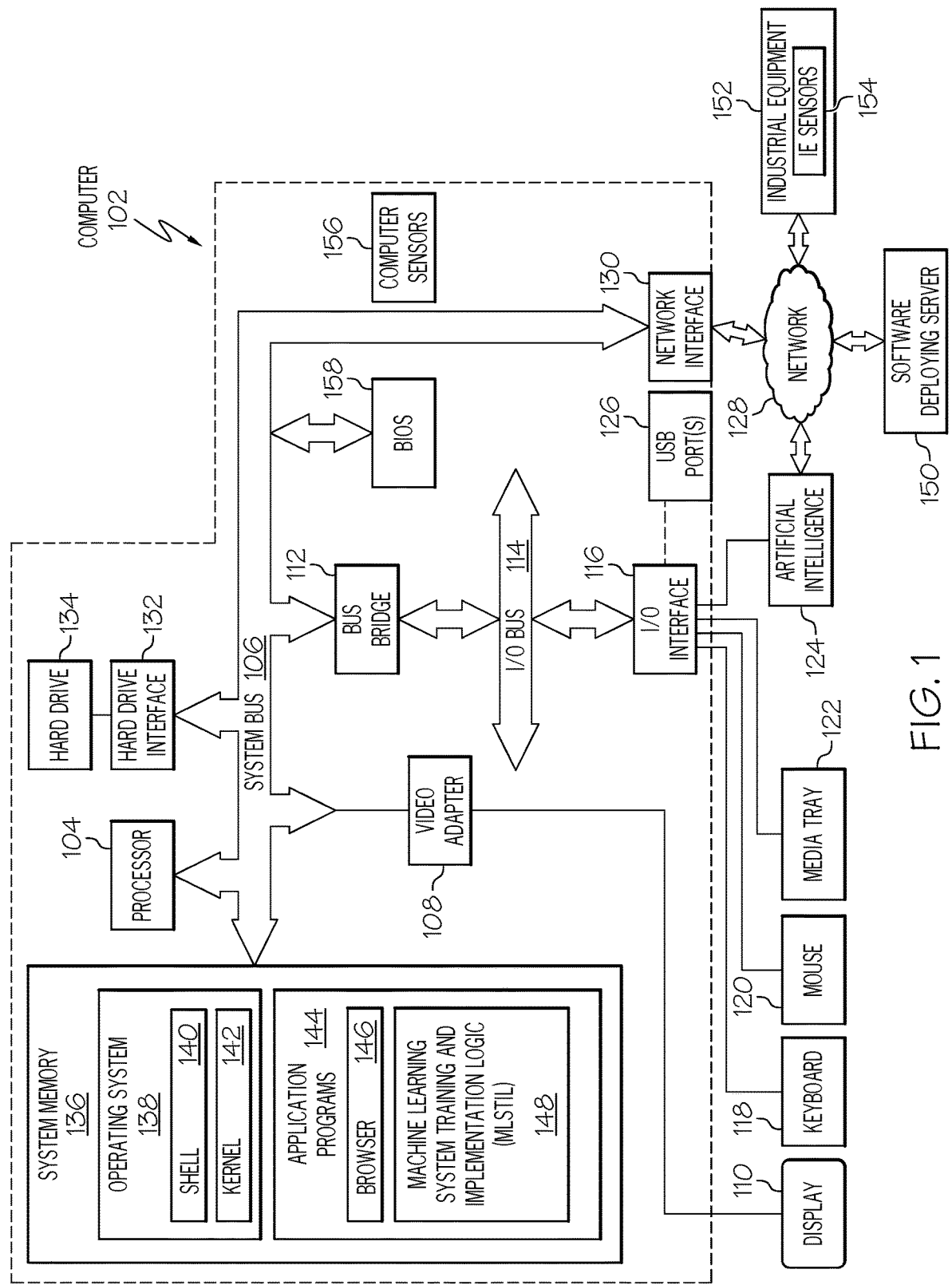
FIG. 1 illustrates an exemplary system and network used in one or more embodiments of the present invention.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connected to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also stored in a computer readable storage medium that, in one or more embodiments, direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to FIG. 1, an exemplary computer system and/or network in accordance with one or more embodiments of the present invention is presented. Note that some or all of the exemplary architecture, including both depicted hardware and software, shown for and within computer 102 can be utilized by artificial intelligence 124 and/or software deploying server 150 and/or industrial equipment 152 and/or IE sensors 154, and/or one or more of the neurons/nodes shown in the RNN 424 depicted in FIG. 4 and FIG. 5.

Exemplary computer 102 includes a processor 104 that is coupled to a system bus 106. Processor 104 can utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which can include storage devices such as CD-ROM drives, multi-media interfaces, etc.), an artificial intelligence 124, and external USB port(s) 126. While the format of the ports connected to I/O interface 116 can be any known to those skilled in the art of computer architecture, in one embodiment some or all of these ports are universal serial bus (USB) ports.

As depicted, computer 102 is also able to communicate with artificial intelligence 124 and/or software deploying server 150 and/or industrial equipment 152 using a network interface 130 to a network 128. Network interface 130 is a hardware network interface, such as a network interface card (NIC), etc. Network 128 can be an external network such as the Internet, or an internal network such as an Ethernet or a virtual private network (VPN). One or more examples of industrial equipment 152 include, but are not limited to, pumps, pressure vessels, storage buildings, power transmission equipment, manufacturing equipment, etc.

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Machine Learning System Training and Implementation Logic (MLSTIL) 148. MLSTIL 148 includes code for implementing the processes described below, including those described in FIGS. 2-6. In one embodiment, computer 102 is able to download MLSTIL 148 from software deploying server 150, including in an on-demand basis, wherein the code in MLSTIL 148 is not downloaded until needed for execution. Note further that, in one embodiment of the present invention, software deploying server 150 performs all of the functions associated with the present invention (including execution of MLSTIL 148), thus freeing computer 102 from having to use its own internal computing resources to execute MLSTIL 148.

As shown in FIG. 1, system bus 106 is coupled a basic input/output system (BIOS) 158, which is firmware that initializes computer resources during the booting process, and to provide runtime services for operating systems and programs.

As discussed below, the process shown in FIG. 4 and FIG. 5 uses a recursive neural network, which is a type of artificial intelligence 124 shown in FIG. 1.

Note that the hardware elements depicted in computer 102 are not intended to be exhaustive, but rather are representative to highlight essential components required by the present invention. For instance, computer 102 can include alternate memory storage devices such as magnetic cassettes, digital versatile disks (DVDs), Bernoulli cartridges, and the like. These and other variations are intended to be within the spirit and scope of the present invention.

In one or more embodiments of the present invention, the terms "machine learning system", "ML learning system", "ML system", "learning system", "model", "machine learning model", and "learning model" are used interchangeably to describe hardware and/or software logic, including but not limited to artificial intelligence, that heuristically generates a particular output based on input data. More specifically, this logic takes labeled and/or unlabeled data and generates a predicted answer to a question that is supported by such labeled/unlabeled data.

Active learning (AL) is a semi-supervised learning technique in which the objective is to train a machine learning model using a minimal number of labeled training instances. Pool-based AL achieves this by intelligently selecting/sampling a batch of instances iteratively from a pool of unlabeled instances and getting them labeled by an oracle (human annotator). The underlying premise is that some unlabeled instances are more informative than others and help train the ML model faster. This kind of learning technique plays a key role when labeled data is scarce and obtaining new labels is expensive or difficult. Some of the use cases that use AL include speech recognition, named entity recognition, text classification, etc.

However, instance labeling in the prior art is problematic. First, it requires a subject matter expert (oracle) to label the features of the instance of data. Such a subject matter expert is often not available, and such labeling requires additional time to perform. Second, instance labeling does not differentiate between the importance of different features, thus leading to an inefficient evaluation of large amounts of data, especially data whose purpose is unknown. One or more embodiments of the present invention overcome this limitation found in the known prior art.

In the prior art, AL algorithms learn from the labels provided by such annotators at a feature-level. The downside to such approaches is that it may be challenging for annotators, who are often not machine learning (ML) experts, to reason about all features of a learning model and provide robust input. Furthermore, prior art is often limited to text classification problems, where "keyword" based features are relatively intuitive to consider. However, such "keyword" approaches provide little scalability or understanding of the underlying problem, which is to determine what question/problem a "bag of data" (e.g., unlabeled data) actually addresses and/or solve.

As described herein, one or more embodiments of the present invention do not require the use of "keywords" when classifying data when describing/defining/identifying feature-level inputs. That is, one or more embodiments of the present invention do not ask an annotator to annotate different elements in an instance of data, but rather ask the annotator to describe a high-level description of the overall type of data found in the instance of data. For example, the overall type of data could be directed to identifying a problem in a particular type of equipment. As such, the annotator does not need the ability to provide annotations for each element in the instance of data. Rather, a model, knowing what type of data is being received, is able to recognize and annotate the elements in the instance of data accordingly.

Thus, one or more embodiments of the present invention present a novel approach to elicit rationale regarding feature ranking and incorporates this additional input as a weighing signal in the sampling strategy. This approach makes it easy for annotators to provide feature-level input, is relatively robust to partial or noisy input, and can be applied to problems beyond text classification. As such, one or more embodiments of the present invention incorporates both instance labels and feature-level input. That is, one or more embodiments of the present invention describe a method that enables AL to incorporate user-annotated feature contribution levels and orders. This enables machine learning models to be trained faster, since fewer learning/training instances are required.

As just described, one or more embodiments of the present invention utilizes active learning (AL), which utilizes a system that interacts with a human annotator, who is asked to provide labels to queries (unlabeled data instances) selected by a query sampling algorithm.

For example, assume that a "bag of data" contains unlabeled data from databases, sensors, etc. that are initially unlabeled (i.e., do not include a label that describes a state/conclusion that is current and/or is predicted based on the data). The query sampling algorithm will select certain combinations of data, each of which is called an "instance of data", according to some rule/algorithm. For example, the query sampling algorithm may select only instances of data that come from a particular database, or from a certain type of sensors, or from a certain physical location, etc.

In one or more embodiments of the present invention, a model is a machine learning resource that examines data, and then generates a question and answer relative to that data. For example, assume that the model receives the following data: 7:28 am CST; January 12; Austin, Texas. The model will recognize this as data that describes the time that sunrise will occur in Austin, Texas on January 12, and thus will also generate a question "What time will the sun rise in Austin, Texas on January 12?". This generated question ("What time will the sun rise in Austin, Texas on January 12?") and/or the associated answer ("The sun will rise on January 12 in Austin, Texas at 7:28 am CST") is called the "label" of this model.

Each time a model receives a new instance of data (i.e., a collection of data), the "label" (i.e., question and/or answer that is associated with that model) is updated in a repetitive manner. That is, each time new data is received by the model, the label associated with that model is updated, such that the model is retrained with all the labelled instances that have been gathered so far, and a new query for further-defined data is selected based on this retrained/updated learning model. This process continues in an iterative manner until the training model reaches certain criteria, such as accuracy, reaching above certain threshold.

In one or more embodiments of the present invention, for each query for further-defined data, annotators are asked to provide additional information about feature contributions (i.e., how the features of the instance contributed to the label generated by the machine learning model). In one or more embodiments of the present invention, such information is in the form of rank order of descriptors of attributes found in the instance of data. In one or more embodiments of the present invention, such information is provided by the annotator directly modifying feature contribution annotations used by the training model.

In one or more embodiments of the present invention, a particular query sampling method called Query by Committee (QBC) is adapted for incorporating feature contribution annotations into the query selection process. The QBC method uses a set of learners for prediction, and it selects query instances where the committee of learners differs the most. This disagreement measure is modified such that it captures the disagreement not only among learning models' predictions, but also between the annotators' annotations and the learner models' predicted feature contributions.

In one or more embodiments of the present invention, the machine learning model whose predicted feature contribution is in agreement with the annotator's model is over-weighted, thereby giving that machine learning model more influence/impact on the overall labels generated by the committee of classifiers described herein. As such, the training model (i.e., the machine learning model) will converge to the annotators' target more quickly.

Feature contributions can also be regarded as rationale for a prediction. In this sense, one or more embodiments of the present invention are essentially asking the annotators to provide rationales for their predictions, and then train the model to learn such rationales directly instead of indirectly from labeled data. The advantage of such a direct learning approach is that the learning is faster than traditional AL methods. This is indeed the case in experiments by the present inventors that utilize the method described herein. That is, the present invention provides a method that needs fewer than half of the queries needed by traditional QBC to reach the same accuracy threshold.

Thus, one or more embodiments of the present invention 1) makes it easy for annotators to provide feature-level input based on specific instance; 2) is relatively robust to partial or noisy input by using feature-level input as weighing signals for the sampling strategy (instead of directly tuning the model features); and 3) can be applied to any kind of model and any kind of (tabular, text, image). For models that are hard to generate learner's feature contribution directly, one or more embodiments of the present invention use post-hoc model-indifferent algorithms to generate locally faithful feature contribution.

As described herein, one or more embodiments of the present invention ask the annotator to provide information about the order or level of feature contributions for the queried data instance, and then incorporates that information into the query selection process, thus favoring learners that generate similar feature contributions. The term "feature contribution" is used to describe an annotator or a learner's assessment on how important a feature is to the prediction for a given data instance and to what direction (positive or negative contribution).

Specifically, in one or more embodiments of the present invention, the annotator provides annotations about feature contributions in two ways. First, during the active learning process, for each query, the annotator specifies the rank order of features in terms of the annotator's belief on how each feature contributed to his or her label prediction. Additional descriptions of this process are discussed below with reference to FIG. 3.

Figure 2:
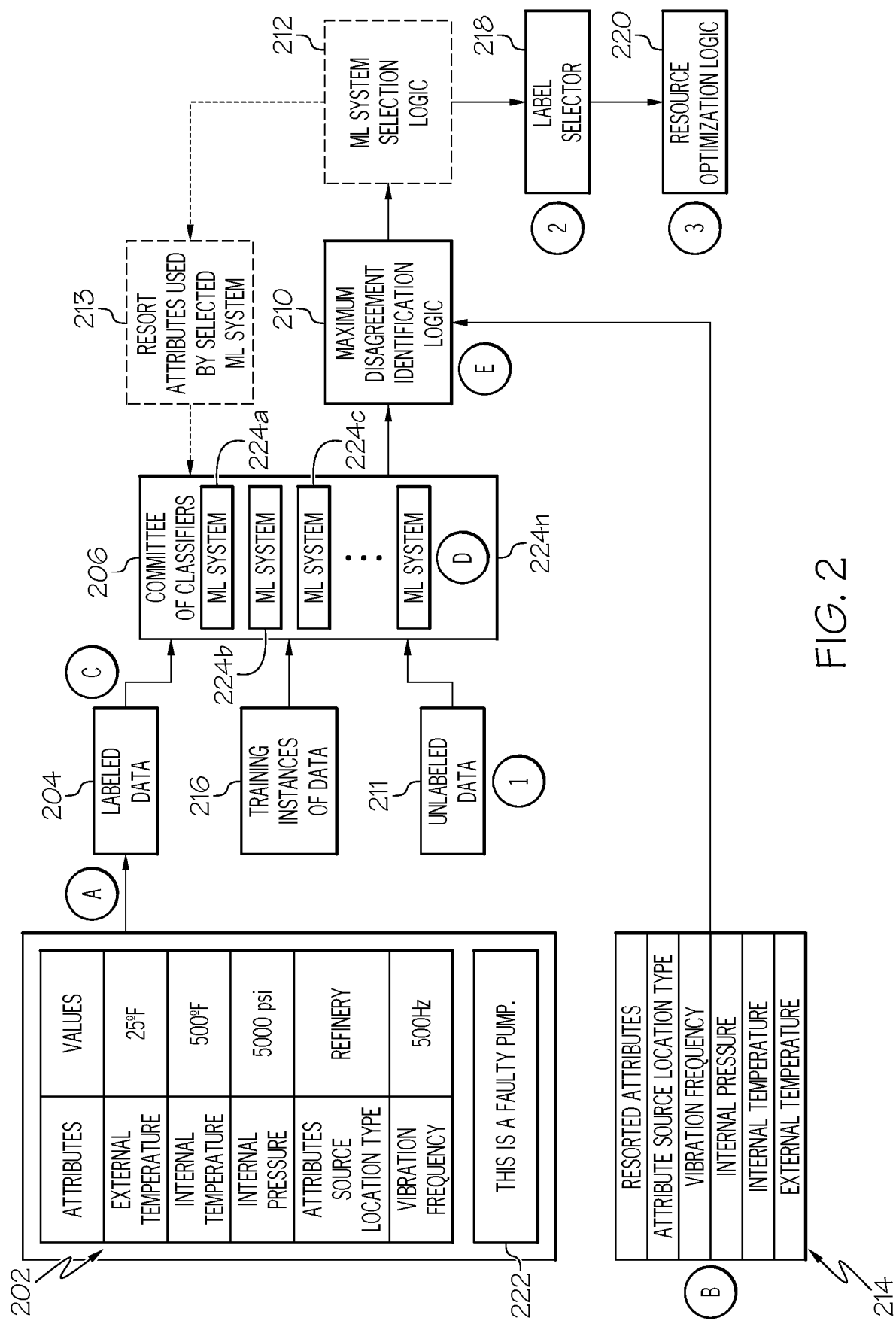
FIG. 2 depicts a high-level overview of one or more embodiments of the present invention.

With reference now to FIG. 2, a high-level overview of one or more embodiments of the present invention is presented.

In the example shown in FIG. 2, the annotator provides an annotator label 222, which states "This is a faulty pump?". This annotator label 222 is associated, by the annotator, with attributes/values 202, which includes data describing the external temperature of a device, an internal temperature of a device, an internal pressure of a device, a location type of the source of the attributes, and a vibration frequency of the device.

As such, by looking at the attributes/values 202, the annotator determines that these attributes and their associated values describe a pump. The annotator further determines that these attributes provide the information "This is a faulty pump.".

As shown by step A, an active learning process combines attributes/values 202 and the annotator label 222 into labeled data 204.

As shown in attributes/values 202, the various attributes are ranked according to an initial level of importance. That is, in the attributes/values 202, the most important attribute from the attributes/values 202 is "external temperature", followed by "internal temperature", followed by "internal pressure", followed by "attributes source location type", followed by the least important attribute "vibration frequency".

That is, a machine learning system and/or an annotator initially determine that the most important factor in determining what the attributes and their values describe is the attribute "external temperature", which describes an external temperature of a device and/or its environment. The system and/or annotator initially determine that the second most important factor in making this determination is the "internal temperature" of the device, facility, etc. The system and/or annotator initially determine that the third most important factor in making this determination is the "internal pressure" of the device, facility, etc. The system and/or annotator initially determine that the fourth most important factor in making this determination is the "attributes source location type", which describes the environment (e.g., a refinery, an office building, a rural location, an urban location, etc.) of the device, facility, etc. The system and/or annotator initially determine that the least important factor in making this determination is the "vibration" of the device, facility, etc.

However, one or more embodiments of the present invention enable the initial annotator and/or another annotator to change these rankings.

Thus, as shown in step B, the annotator (i.e., the initial annotator and/or another annotator and/or a ML system) is able to change the rankings of these various attributes (from most important to least important) to "attribute source location type", "vibration frequency", "internal pressure", "internal temperature", and "external temperature". That is, the annotator determines that the most important factor/attribute in determining 1) that the attribute values are describing a pump, and 2) that the pump is faulty, is the location from which the other attribute values are being sent. For example, if the vibration, pressure, and temperature values are coming from a refinery (e.g., from sensors in the refinery), then they likely are describing a pump. However, if the vibration, pressure, and temperature readings come from an office, then they likely are describing a heating/ventilation/air conditioning (HVAC) system. This resorting results in resorted attributes 214.

Figure 3:
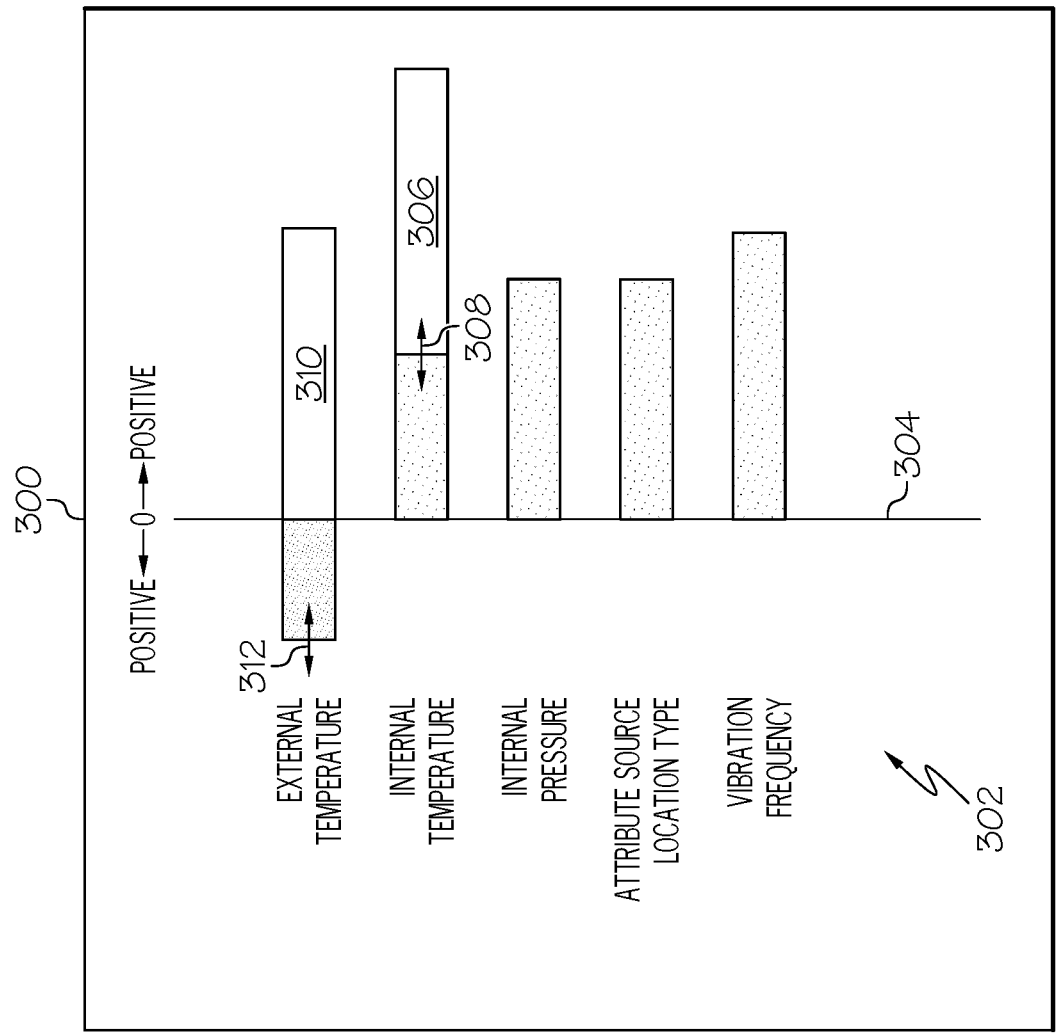
FIG. 3 illustrates an exemplary user interface used to adjust weights and/or rankings of data attributes in accordance with one or more embodiments of the present invention.

In shown in FIG. 3, one or more embodiments of the present invention provide a user interface 300 that the annotator can use to manually adjust the importance of the attributes shown in attributes/values 202 in FIG. 2.

As shown in FIG. 3, the user interface shows a chart 302 of the attributes shown in attributes/values in FIG. 2. The chart 302 shows the level of influence each attribute has in arriving at a particular label, as deemed by one or more annotators. As shown by reference line 304, some attributes are useful in arriving at a particular label, while some are actually counter-productive.

For example, consider the attribute "internal temperature". Initially, an annotator considered this to be an important attribute when creating the label for the attributes/values described in FIG. 2, as shown in bar 306. However, the annotator (or another annotator) later considers this attribute to be less important, and thus moves slider 308 to reduce the level of importance for this attribute when creating the label.

Similarly, assume that an annotator initially considered "external temperature" to be important when creating the label for the attributes/values shown in FIG. 2, as shown in bar 310. However, the annotator (or another annotator) later considers this attribute to actually be detrimental in creating the label. As such, moving the slider 312 into negative territory gives the attribute "external temperature" a negative value, such that this attribute is heavily discounted, if not ignored entirely or even deemed to be a factor that leads to an incorrect label, when evaluating the attributes/values.

Returning to FIG. 2, and as shown in step C, the labeled data 204 (i.e., the combination of the original attributes/values 202 and the annotator label 222) is sent to a committee of classifiers 206 for evaluation. The committee of classifiers 206 are a group of learners, which in one or more embodiments of the present invention are machine learning systems 224a-224n. An exemplary type of machine learning system is an artificial intelligence, such as the artificial intelligence 124 shown in FIG. 1. In one or more embodiments of the present invention, this artificial intelligence is a neural network, such as a Deep Neural Network (DNN), a Convolutional Neural Network (CNN), or a Recurrent Neural Network (RNN).

Logic units within an electronic neural network (e.g., an RNN) are referred to as "neurons" or "nodes". If the electronic neural network is implemented entirely in software, then each neuron/node is a separate piece of code (i.e., instructions that perform certain actions). If the electronic neural network is implemented entirely in hardware, then each neuron/node is a separate piece of hardware logic (e.g., a processor, a gate array, etc.). If the electronic neural network is implemented as a combination of hardware and software, then each neuron/node is a set of instructions and/or a piece of hardware logic.

A neural network, as the name implies, is roughly modeled after a biological neural network (e.g., a human brain). A biological neural network is made up of a series of interconnected neurons, which affect one another. For example, a first neuron can be electrically connected by a synapse to a second neuron through the release of neurotransmitters (from the first neuron) which are received by the second neuron. These neurotransmitters can cause the second neuron to become excited or inhibited. A pattern of excited/inhibited interconnected neurons eventually lead to a biological result, including thoughts, muscle movement, memory retrieval, etc. While this description of a biological neural network is highly simplified, the high-level overview is that one or more biological neurons affect the operation of one or more other bio-electrically connected biological neurons.

An electronic neural network similarly is made up of electronic neurons. However, unlike biological neurons, electronic neurons are never technically "inhibitory", but are often only "excitatory" to varying degrees.

In an electronic neural network, neurons are arranged in layers, known as an input layer, hidden layer(s), and an output layer. The input layer includes neurons/nodes that take input data, and send it to a series of hidden layers of neurons, in which all neurons from one layer in the hidden layers are interconnected with all neurons in a next layer in the hidden layers. The final layer in the hidden layers then outputs a computational result to the output layer, which is often one or more nodes for holding vector information.

Figure 4:
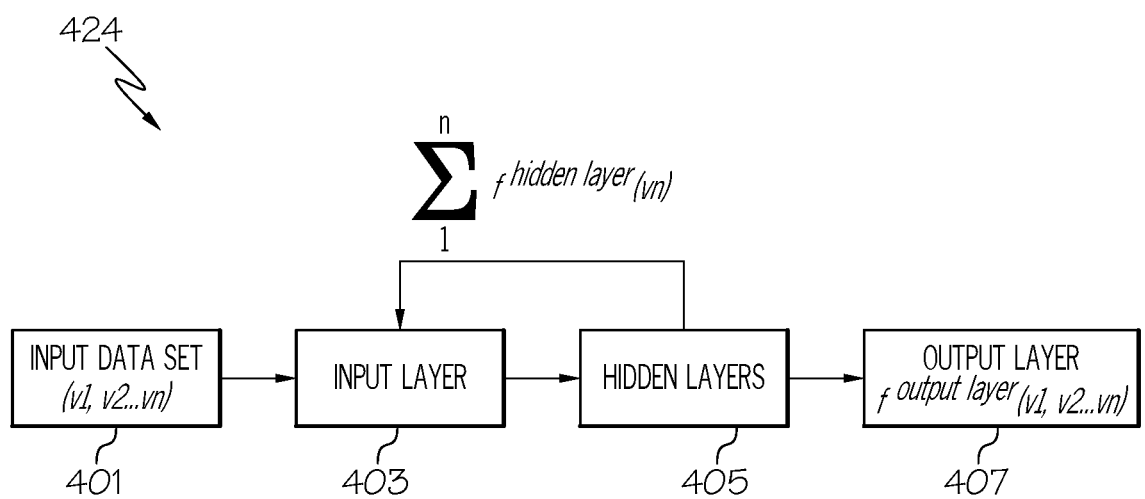
FIG. 4 illustrates an exemplary recurrent neural network used to improve the performance of a machine learning system, computer and/or other devices in accordance with one or more embodiments of the present invention.

With reference then to FIG. 4, an exemplary Recurrent Neural Network (RNN) 424 used to evaluate instances of labeled and/or unlabeled data, determine maximum variances between different machine learning systems, etc., is presented.

As shown in FIG. 4, an input data set 401 is a series of multivariate values, depicted as v1, v2 . . . vn. This series of values can be different values of attribute descriptors and/or their values in a single time series, or can be different values of data from different time series.

Input data set 401 is entered into an input layer of RNN 424, which passes the data from input data set 401 to an input layer 403, and then on to hidden layers 405 for processing. As the name recurrent neural network infers, an output from the hidden layers 405 for a current vector (e.g., $f(v_1)$) is fed back to the input layer 403, such that the current output for the current vector $f(v_1)$ is combined with a next input vector (e.g., $v_2$) to create a new output from the hidden layers 405 (e.g., $f(v_1+v_2)$). This process repeats until all vectors from the input data set 401 and their precursive processing results are processed, resulting in an output to the output layer 407, shown as $f^{output\ layer}(v_1, v_2 \ldots v_n)$.

Figure 5:
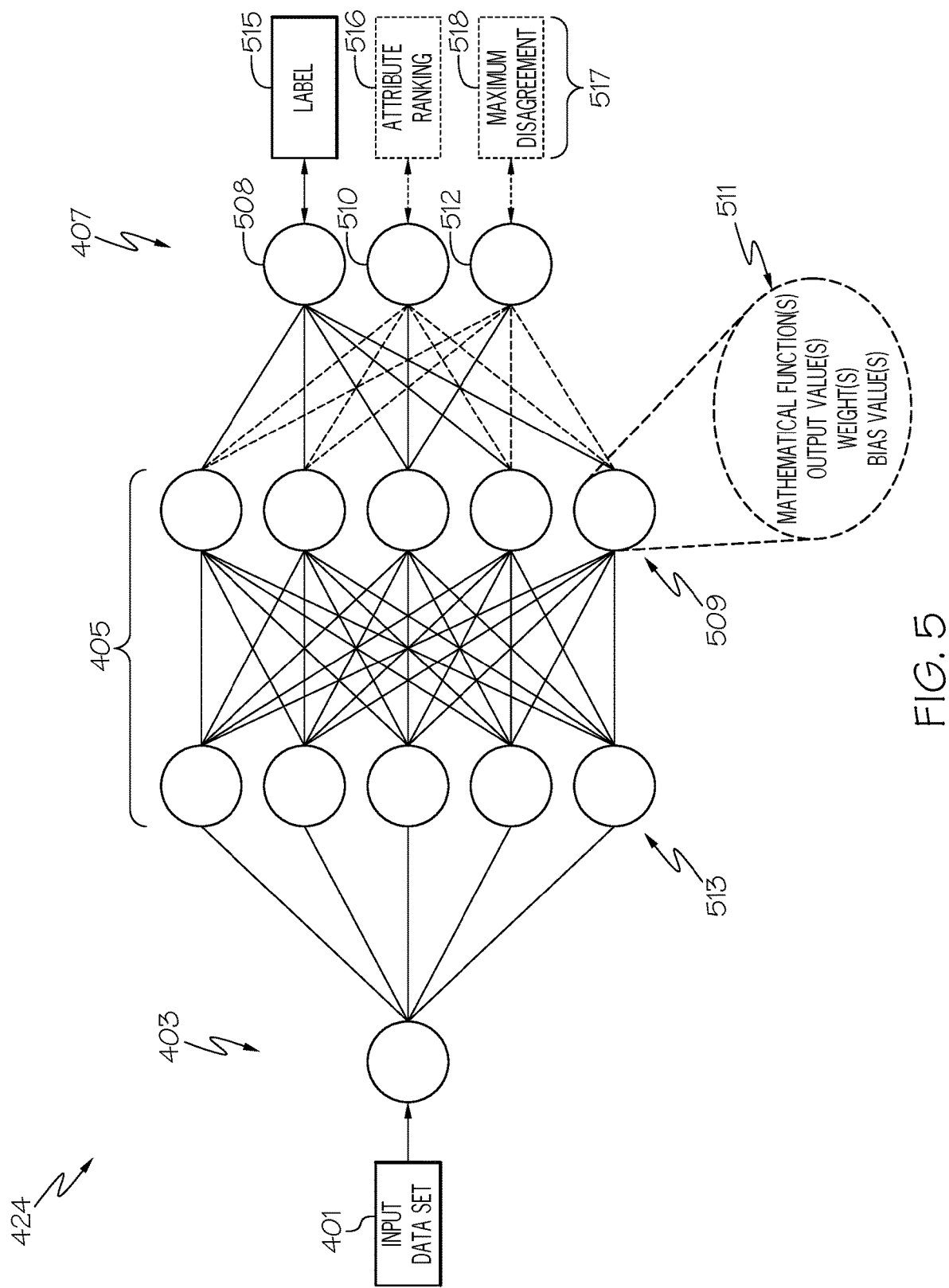
FIG. 5 depicts additional detail of the exemplary recurrent neural network shown in FIG. 4.

With reference now to FIG. 5, additional detail of the RNN 424 shown in FIG. 4 is presented.

As shown in FIG. 5, the electronic neurons of the RNN 424 depicted in FIG. 4 are arranged in layers, known as the input layer 403, hidden layers 405, and an output layer 407. The input layer 403 includes neurons/nodes that take input data, and send it to a series of hidden layers of neurons (e.g., hidden layers 405), in which neurons from one layer in the hidden layers are interconnected with all neurons in a next layer in the hidden layers 405. The final layer in the hidden layers 405 then outputs a computational result to the output layer 407, which is often multiple nodes, each of which holds vector information. This information is then sent to the output 517, where it is accessible to other processes, users, etc.

Thus, the RNN 424 is used for various operations, including but not limited to generating labels, ranking attributes, establishing maximum disagreement levels, etc., as used in an active learning system.

For example, in one or more embodiments of the present invention the RNN 424 (used as the architecture for each of the ML systems 224a-224n) defines a label for a particular instance of data found in the input data set 401, such that output layer node 508 includes a vector that describes, or else points to, a particular label for a particular instance of data, as shown in output block 515 in output 517. In one or more embodiments of the present invention, the label shown in block 515 is generated using rules and/or mathematical function(s), such as shown in block 511 and discussed below.

In one or more embodiments of the present invention in which RNN 424 is used as the architecture for each of the ML systems 224a-224n shown in FIG. 2, the output 517 includes an output layer node 510 that describes attribute rankings (of attributes of instances of data) that are created by each of the ML systems 224a-224n. These attribute rankings are then output to output block 516 in output 517. In one or more embodiments of the present invention, the output ranking shown in block 516 is generated using rules and/or mathematical function(s), such as shown in block 511 and discussed below.

In one or more embodiments of the present invention in which RNN 424 is used to identify which two machine learning systems (e.g., ML system 224a and ML system 224b shown in FIG. 2, whose features are described in input data set 401) are more disparate with one another as compared to other ML systems in the committee of classifiers 206, output layer node 510 includes a vector that describes, or else points to, the two machine learning systems from the committee of classifiers 206 that have the most disagreement (i.e., have the greatest amount of disparity). For example, input data set 401 describes the labels generated by all of ML systems 224a-224n, and/or a ranking of attributes of instances of data evaluated by ML systems 224a-224n, and then identifies which two ML systems (e.g., ML system 224a and ML system 224b) have more disagreement (maximum disagreement 516) between themselves that other ML systems from ML systems 224a-224n. This identification of maximum disagreement is output to output block 518 in output 517. In one or more embodiments of the present invention, the maximum disagreement shown in block 518 is generated using rules and/or mathematical function(s), such as shown in block 511 and discussed below.

Thus, in one or more embodiments of the present invention, each neuron in the output layer 407 is associated with a particular output to output 517, as shown in FIG. 5.

As mentioned above, each node in the depicted RNN 424 represents an electronic neuron, such as the depicted neuron 509. As shown in block 511, each neuron (including neuron 509) includes multiple features, such as: a mathematical function, an output value, a weight, and a bias value.

The mathematical function is a mathematic formula for processing data from one or more upstream neurons. For example, assume that one or more of the neurons depicted in the middle hidden layers 405 send data values to neuron 509. Neuron 509 then processes these data values by executing the mathematical function shown in block 511, in order to create one or more output values, which are then sent to another neuron, such as another neuron within the hidden layers 405 or a neuron in the output layer 407. Each neuron also has a weight that is specific for that neuron and/or for other connected neurons. Furthermore, the output value(s) are added to bias value(s), which increase or decrease the output value, allowing the RNN 424 to be further "fine-tuned".

For example, assume that neuron 513 is sending the results of its analysis of a piece of data to neuron 509. Neuron 509 has a first weight that defines how important data coming specifically from neuron 513 is. If the data is important, then data coming from neuron 513 is weighted heavily, and/or increased by the bias value, thus causing the mathematical function (s) within neuron 509 to generate a higher output, which will have a heavier impact on neurons in the output layer 407. Similarly, if neuron 513 has been determined to be significant to the operations of neuron 509, then the weight in neuron 513 will be increased, such that neuron 509 receives a higher value for the output of the mathematical function in the neuron 513. Alternatively, the output of neuron 509 can be minimized by decreasing the weight and/or bias used to affect the output of neuron 509. These weights/biases are adjustable for one, some, or all of the neurons in the RNN 424, such that a reliable output will result from output layer 407. Such adjustments are alternatively performed manually or automatically.

When manually adjusted, the mathematical function(s), output value(s), weight(s), and/or bias value(s) are adjusted by the user in a repeated manner until the output from output layer 407 matches expectations. The content of the neuron/node in the output layer 407 is compared with the expected vector. The mathematical function(s), output value(s), weight(s), and/or bias value(s) shown in block 511 are manually adjusted until the data series variability 515 output is determined.

When automatically adjusted, the mathematical functions, output values, weights, and/or biases are adjusted using "back propagation", in which a "gradient descent" method determines how each mathematical function, output value, weight, and/or bias should be adjusted in order to provide an output 517 that is accurate. That is, the mathematical function(s), output value(s), weight(s), and/or bias value(s) shown in block 511 are recursively adjusted until the data series variability 515 output is determined.

Returning now to FIG. 2, step D indicates that the committee of classifiers 206 1) generates labels for not only the labeled data 204, but also the training instances of data 216, and 2) determines what order of significance each attribute found in the data has on generating the labels. That is, the committee of classifiers 206 evaluates training instances of data 216, which are labeled and/or unlabeled and/or a combination thereof. However, in various scenarios, each of the ML systems 224a-224n independently ranks the attributes in the training instances of data 216 on its own. For example, each ML system 224a-224n either uses the architecture of a machine learning system (e.g., RNN 424 shown in FIG. 5), or else uses another machine learning system (e.g., a DNN, CNN, etc.), to perform the work of generating labels and/or ranking the attributes of the instances of data.

In one or more embodiments of the present invention, each ML system (from ML systems 224a-224n) in the committee of classifiers 206 is weighted, in order to obtain a weighted combination of the ML systems 224a-224n for creating accurate labels from data. In one or more embodiments of the present invention, the weights for each learner (i.e., one or more of the ML systems 224a-224n) of the committee of classifiers 206 is determined by the similarity between their predicted and the user-annotated feature contributions. As such, if the annotation is the rank order of the features of the attributes, one or more embodiments of the present invention use a vector distance, such as a Kendall tau rank distance, to get a similarity score. If the annotation is a modification of the feature contribution values, one or more embodiments of the present invention use a Euclidean distance between vectors the describe the labels to determine similarity.

As shown in step E in FIG. 2, a maximum disagreement identification logic 210 (e.g., the RNN 424 shown in FIG. 5) selects a next query instance to be evaluated by the committee of classifiers 206. A "Max Disagreement" is utilized by the maximum disagreement identification logic for selecting the query instance based on a particular outlier ML system from the ML systems 224a-224n that is most different in its label and/or its confidence in its label.

For example, assume that ML system 224a, by evaluating the labeled data 204 and training instances of data 216, comes to the conclusion that this data describes a pump that is in proper working order (using the values described above), but is only 20% confident that this label ("This is a properly working pump") is correct. Assume that all of the other ML systems 224b-224n generate a label "This is a faulty pump", with a confidence level of 95% in their labels. Therefore, ML system 224a is in the maximum disagreement from the other ML systems 224a-224n, and needs to be retrained.

As such, an ML system selection logic 212 chooses ML system 224a for retraining, and resorts (i.e., re-ranks) the attributes used by ML system 224a (see block 213) to comport more closely with the attribute rankings used by the other ML systems 224b-224n. This provides a process for more quickly bringing all of the ML systems 224a-224n in line in their training.

In one or more embodiments of the present invention, a difference measure (e.g., a Kullback-Leibler (KL) divergence score) is modified by multiplying the difference by the similarity weights derived from the feature contribution comparison. The following pseudo-code describes this process:

learners weights=Kendal_tau(user_annotated_feature_contribution, learners_feature_contribution)
for i in all_unlabeled_samples:
    learner_KL_divergence[i]=entropy(learner_proba, consensus_proba)
max disagreement=argmax_i{(learner_weights* learner_KL_divergence)}

This process achieves a high F1 score (i.e., a score for accuracy in training the ML systems 224a-224n) with much fewer queries, thus improving the functionality of the overall system.

Returning to FIG. 2, a three-step process (Steps 1, 2, 3) for optimizing a particular resource (e.g., computer 102 or industrial equipment 152 shown in FIG. 1) using a trained committee of classifiers 206 in accordance with one or more embodiments of the present invention is presented.

Step 1 shows the trained committee of classifiers 206 evaluating unlabeled data 211. In one or more embodiments of the present invention, although unlabeled data 211 does not have a label that describes a state of a particular type of resource, it does describe a particular resource that is being described by the values for attributes in the unlabeled data 211.

Step 2 shows that, once the committee of classifiers 206 is trained to a predefined level of accuracy, a consensus of the committee of classifiers 206 generate a consensus label for the unlabeled data 211, which is identified by a label selector 218 (e.g., computer 102 shown in FIG. 1, RNN 424 shown in FIG. 4, etc.).

As shown in Step 3, a resource optimization logic 220 (e.g., computer 102 shown in FIG. 1, RNN 424 shown in FIG. 4, etc.), then optimizes the resource that is identified by the unlabeled data 211 and the label generated by the committee of classifiers 206. For example, assume that the resource is a particular pump, as described in the example above. Assume further that the label generated by the committee of classifiers 206 is "This is a faulty pump". Finally, assume that the value for the attribute "internal temperature" is 25° F. The resource optimization logic 220 interprets this value as an indication that there is no liquid fluid going through that pump, and will activate an electro-mechanical valve to open a feed line (not shown) of 500° F. liquid feedstock going to that pump, such that this pump is now pumping hot liquid as designed.

Figure 6:
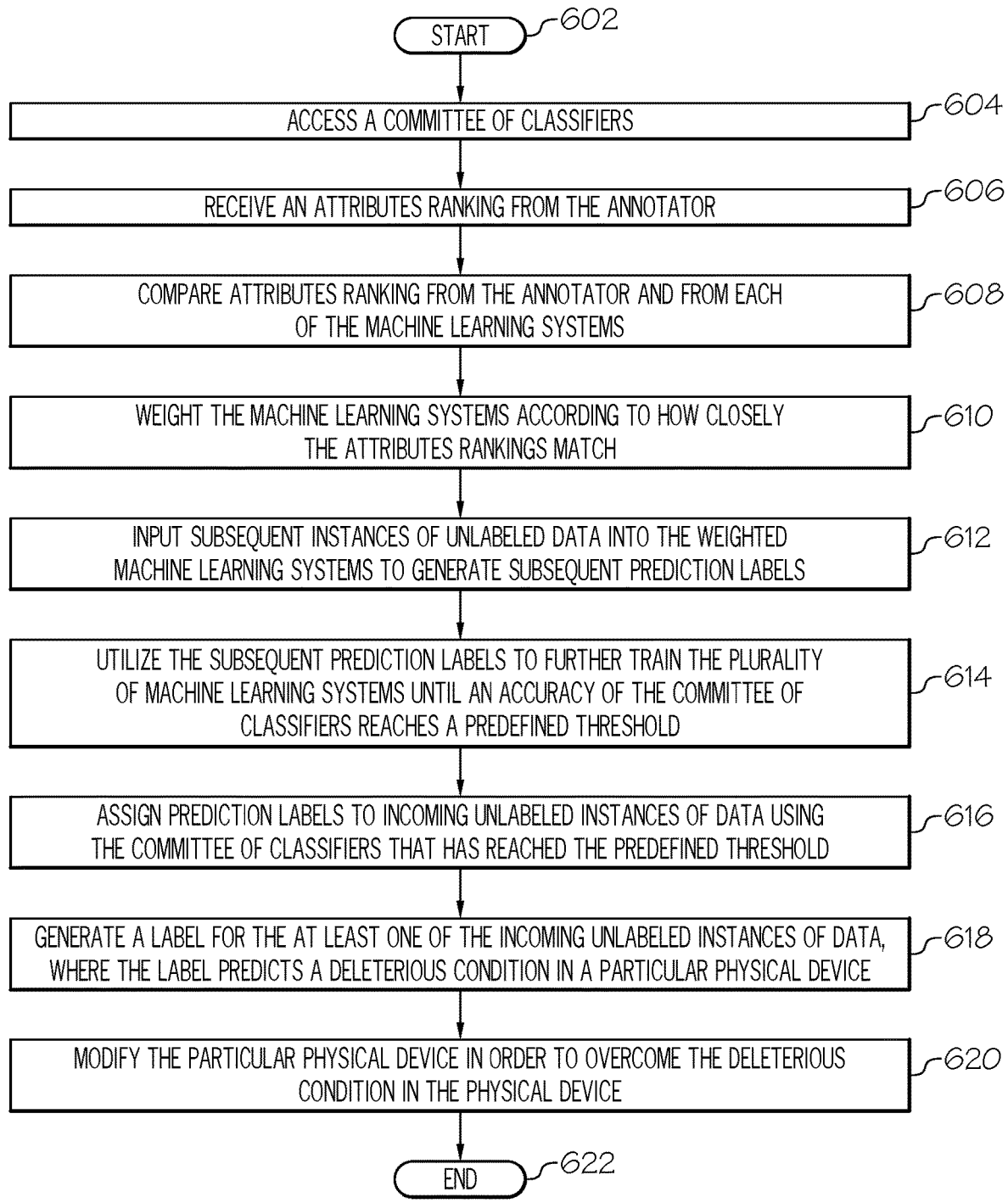
FIG. 6 illustrates a high-level flow chart of one or more steps performed in accordance with one or more embodiments of the present invention.

With reference now to FIG. 6, a high level flow chart of a method for optimizing and/or utilizing machine learning systems is presented.

After initiator block 602, a computing device (e.g., computer 102 shown in FIG. 1) accesses a committee of classifiers (e.g., committee of classifiers 206 shown in FIG. 2), as shown in block 604. As described herein, the committee of classifiers is composed of a plurality of machine learning systems (e.g., ML systems 224a-224n shown in FIG. 2), which have been trained using an initial labeled instance of data from an annotator. The initial labeled instance of data comprises attributes of the data and initial values of the attributes (e.g., the attributes/values 202 shown in FIG. 2), and an initial prediction label (e.g., annotator label 222 shown in FIG. 2) that describes an initial predicted state (e.g., "This is a faulty pump") based on the values.

As described in block 606, the computing device receives an attributes ranking (e.g., resorted attributes 214 shown in FIG. 2) from the annotator. This attributes ranking is based on a determination by the annotator of an impact level that each attribute has when generating a prediction label for an instance of data that has the attributes of the initial labeled instance of data.

As described in block 608, the computing device compares the attributes ranking from the annotator to attributes rankings that are generated by and used by each of the machine learning systems when evaluating one or more instances of unlabeled data that include the attributes. For example, the annotator could rank the attributes as shown in resorted attributes 214, but each of the ML systems could use another ranking, such as that shown in attributes/values 202 in FIG. 2.

As described in block 610, the computing device weights the machine learning systems according to how closely each of the attributes rankings generated by and used by each of the machine learning systems match the attributes ranking from the annotator, such that the weighting defines weighted machine learning systems. For example, if ML system 224a uses a same or very similar attribute ranking as found in the resorted attributes 214 from the annotator, then ML system 224 is weighted more heavily when creating a consensus among the committee of classifiers 206 for a label generated by a particular instance of data.

As described in block 612, the computing device inputs one or more subsequent instances of unlabeled data (e.g., unlabeled data 211 shown in FIG. 2) into the weighted machine learning systems to generate subsequent prediction labels for the one or more subsequent instances of unlabeled data. These one or more subsequent instances of unlabeled data include the attributes of the data found in the initial labeled instance of data (e.g., the attributes found in attributes/values 202), but have new values for those attributes.

As described in block 614, the computing device utilizes the subsequent prediction labels (as generated by the committee of classifiers—plurality of machine learning systems) to further train the plurality of machine learning systems until an accuracy of the committee of classifiers reaches a predefined threshold. As such, reaching the predefined threshold defines the committee of classifiers as being trained and optimized to accurately generate prediction labels for future unlabeled incidents of data that have the attributes of the initial incident of data.

As described in block 616, in one or more embodiments of the present invention, the computing device assigns prediction labels to incoming unlabeled instances of data using the committee of classifiers that has reached the predefined threshold.

As described in block 618, in one or more embodiments of the present invention in which at least one of the incoming unlabeled instances of data describe features of a particular physical device (e.g., is sensor data from the computer sensors 156, which monitor operational conditions such as page swaps, instruction throughput, bus bandwidth, etc. of the computer 102 shown in FIG. 1; the industrial equipment (IE) sensors 154 that monitor temperatures, pressures, vibration, etc. of the industrial equipment 152 shown in FIG. 1), the computing device generates a label for the at least one of the incoming unlabeled instances of data. As shown in FIG. 2, this predicts a deleterious condition ("This is a faulty pump") in the particular physical device.

As described in block 620, the computing device and/or a user modifies the particular physical device based on the deleterious condition identified by the label for the at least one of the incoming unlabeled instances of data. This modifying of the particular physical device overcomes the deleterious condition in the physical device, as described above.

In one or more embodiments of the present invention, the particular physical device is a BIOS chip, such as that shown as BIOS 158 in FIG. 1. As such, in one or more embodiments of the present invention, the label identifies a deleterious condition of the BIOS 158. For example, the label can state "This BIOS will fail to identify and initialize the hard drive in its computer". Based on this label, the BIOS 158 is reprogrammed by a user and/or an intelligent system (e.g., RNN 424 discussed above) in order to recognize that hard drive during the booting process. That is, artificial intelligence 124 (e.g., RNN 424) receives the attributes/values describing the BIOS's bootup state, recognizes that it is failing to recognize the hard drive (e.g., hard drive 134 in computer 102), and will send reprogramming instructions (via network interface 130) that are sent directly to the BIOS 158 to reprogram the BIOS 158 to recognize hard drive 134 during the booting process, thereby improving the functionality of the BIOS 158 as well as the computer 102.

The flow-chart shown in FIG. 6 ends at terminator block 622.

In one or more embodiments of the present invention, the computing device repeats the receiving, comparing, weighting, inputting, and utilizing steps described in blocks 606-614 in FIG. 6 using annotator-labeled versions of the one or more subsequent instances of data until the accuracy of the committee of classifiers reaches the predefined threshold. That is, new instances of unlabeled data are labeled by the annotator.

As described herein, the unlabeled data chosen to be labeled by the annotator are based on identifying a maximum disparity data instance. That is, in one or more embodiments of the present invention, the computing device calculates a level of disparity among the committee of classifiers when evaluating the one or more subsequent instances of unlabeled data. This disparity is based on differences in the subsequent prediction labels. For example, the average label from ML system 224a when evaluating unlabeled data could be "Label A with a confidence level of 90%"; the average label from ML system 224b when evaluating unlabeled data could be "Label B with a confidence level of 90%"; and the average label from ML system 224c when evaluating unlabeled data could be "Label C with a confidence level of 20%". Assume now that Label A and Label B are very similar (e.g., they both predict/label the initially unlabeled data as describing a faulty pump) but that Label C predicts/labels the initially unlabeled data as describing a properly functioning airplane. Due to the differences in the predictions/labels and confidence labels by ML system 224c and ML systems 224a/224b, ML system 224c has the maximum (greatest) disagreement level.

Now that the system knows which ML system is the "outlier", it will then identify what instances of data (or types of instances of data) have caused this maximum disagreement level between ML system 224c and the other ML systems in the committee of classifiers 206. That is, the computing device then identifies a maximum disparity data instance of unlabeled data from the one or more subsequent instances of unlabeled data that created this maximum disparity in the prediction labels and the confidences in the prediction labels by the committee of classifiers.

Using this information, the computing device then generates a new training instance of data using the maximum disparity data instance and a new label for the maximum disparity data instance from the annotator. That is, if the maximum disparity data instance was not properly labeled by ML system 224c in the way that ML system 224a and ML system 224b labeled that maximum disparity data instance, the computing system will append a version of the label created by ML system 224a and ML system 224b when processing the maximum disparity data instance to that maximum disparity data instance to create a new training instance of data, which is then used to further optimize ML system 224c and any other relevant ML systems in the committee of classifiers by retraining these systems with the new training instance of data.

As described in FIG. 5, in one or more embodiments of the present invention, the plurality of machine learning systems are trained by a neural network. That is, the machine learning systems are either neural networks themselves, or else they are other learning systems that are trained by a neural network. More specifically, in one or more embodiments of the present invention, the input data set 401 shown in FIG. 5 includes the labels generated by and the levels of disagreement among the committee of classifiers. The neural network (e.g., RNN 424) then outputs labels (block 515) and attribute rankings (block 516) that are used to train the machine learning systems, including but not limited to the machine learning systems that are in maximum disagreement (block 518) with other machine learning systems in the committee of classifiers.

In one or more embodiments of the present invention, a method trains machine learning models.

A computing device trains a plurality of machine learning models with an initial labeled instance of data from an annotator, where the initial labeled instance of data comprises attributes of the data, initial values of the attributes, and an initial prediction label that describes an initial predictive state based on the values, and where the plurality of machine learning models are components of a committee of classifiers. That is, the initial prediction label is a prediction such as predicting the state of a resource, such as "This is a faulty state".

The computing device compares a ranking of the attributes from the annotator to rankings of the attributes used by each of the machine learning models, and weights the machine learning models according to how closely each of the rankings of the attributes used by each of the machine learning models their match the ranking of the attributes from the annotator.

The computing device inputs one or more subsequent instances of unlabeled data into the plurality of trained machine learning models, where the unlabeled data comprises the attributes of the data found in the initial labeled instance of data and new values of the attributes, and where the unlabeled data has no prediction label that describes predictive states based on the new values.

The committee of classifiers generate subsequent prediction labels for the one or more subsequent instances, and the computing device calculates a level of disparity among the committee of classifiers when evaluating the one or more subsequent instances of unlabeled data, where the disparity is based on differences in the subsequent prediction labels, and where the disparity is based on differences in the confidences in the subsequent prediction labels by the committee of classifiers.

The computing device identifies a maximum disparity data instance of unlabeled data from the one or more subsequent instances of unlabeled data that creates a maximum disparity in the prediction labels and the confidences in the prediction labels, and then generates a new training instance of data using the maximum disparity data instance and a new label from the annotator.

These steps of training, comparing, weighting, inputting, calculating, identifying and generating with the new training instance of data and subsequent new training instances of data are repeated until an accuracy of the committee of classifiers reaches a predefined threshold, such that reaching the predefined threshold defines the committee of classifiers as being suitably trained to accurately generate labels for future unlabeled incidents of data that have the attributes of the initial incident of data.

The committee of classifiers that have reached the predefined threshold then assign labels to incoming unlabeled instances.

In one or more embodiments of the present invention, a method modifies a physical device in order to overcome a deleterious condition in the physical device by creating a new machine learning model.

A computing device receives attributes of an instance of data, where the attributes describe one or more features of a physical device, and receives a first importance ranking of the attributes of the instance of data.

The computing device, utilizing a first machine learning model from a plurality of machine learning models, generates a first label for the instance of data based on the first importance ranking, where the first label describes a first possible deleterious condition in the physical device.

The computing device receives a second importance ranking of the attributes of the instance of data, and then generates, by utilizing a second machine learning model from a plurality of machine learning models, a second label for the instance of data based on the second importance ranking, where the second label describes a second possible deleterious condition in the physical device.

The computing device determines that the first label and the second label are more disparate to one another than other labels generated by other pairs of machine learning models from the plurality of machine learning models using the instance of data, and modifies at least one of the first machine learning model and the second machine learning model to create a third machine learning model, such that a third label generated from the instance of data by the third machine learning model matches a label of at least one of the modified first machine learning model and the modified second machine learning model within a predefined confidence level.

The computing device applies the instance of data to the third machine learning model to identify an actual deleterious condition in a physical device that is described by the instance of data.

The physical device is then modified based on the actual deleterious issue identified by the third machine learning model, such that modifying the physical device overcomes the actual deleterious issue in the physical device.

In one or more embodiments of the present invention, a neural network trains the machine learning models, as described herein.

In one or more embodiments of the present invention, the computing device weights the machine learning systems according to how closely each of the attributes rankings generated by and used by each of the machine learning systems match the attributes ranking from the annotator, such that the weighting defines weighted machine learning systems, as described herein. The computing device then updates the committee of classifiers with the weighted machine learning systems. That is, the original machine learning systems in the committee of classifiers are replaced with the weighted machine learning systems.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
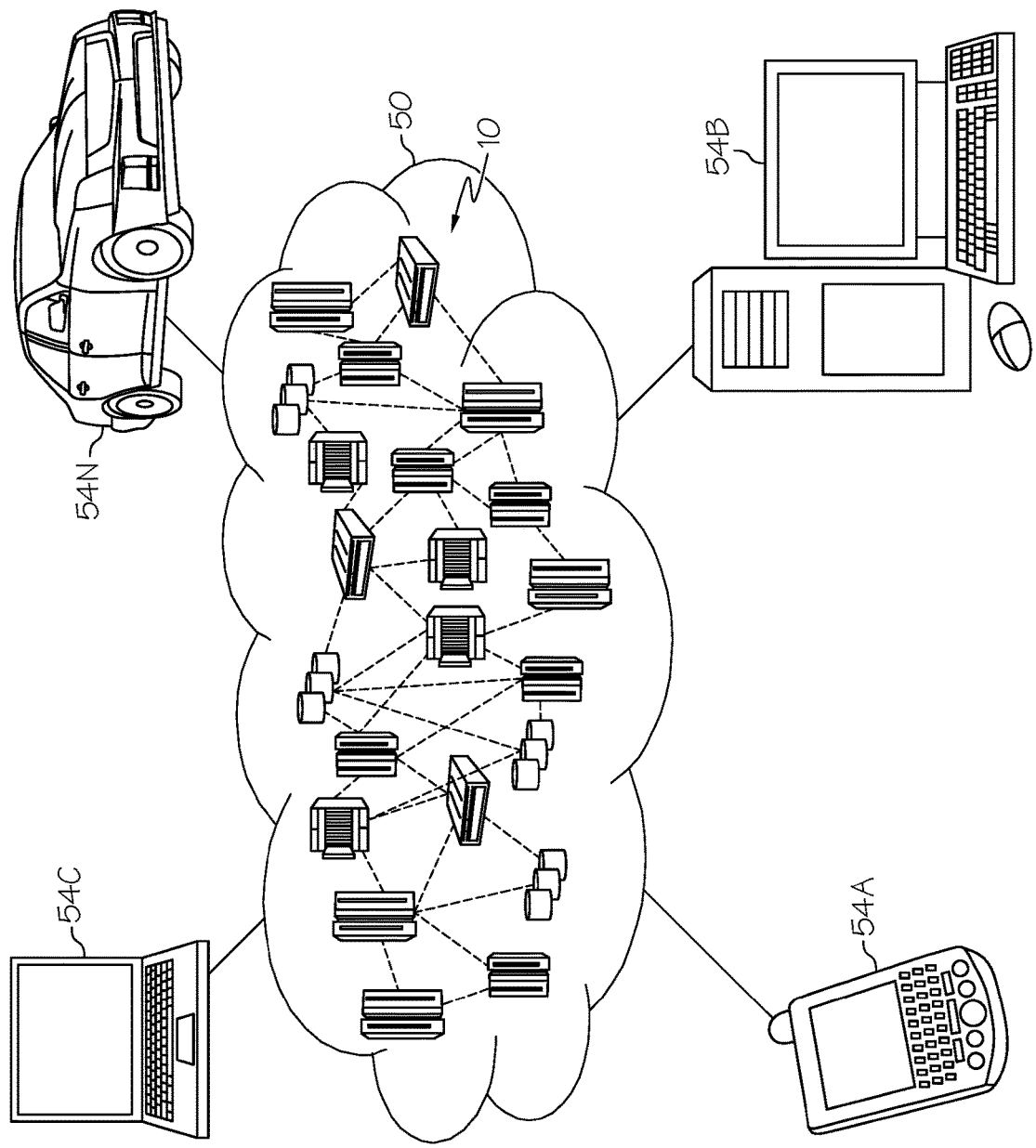
FIG. 7 depicts a cloud computing environment according to one or more embodiments of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 7 are intended to be illustrative only and that computing nodes 10 and cloud computing environment 50 can communicate with any type of computerized device over any type of network and/or network addressable connection (e.g., using a web browser).

Figure 8:
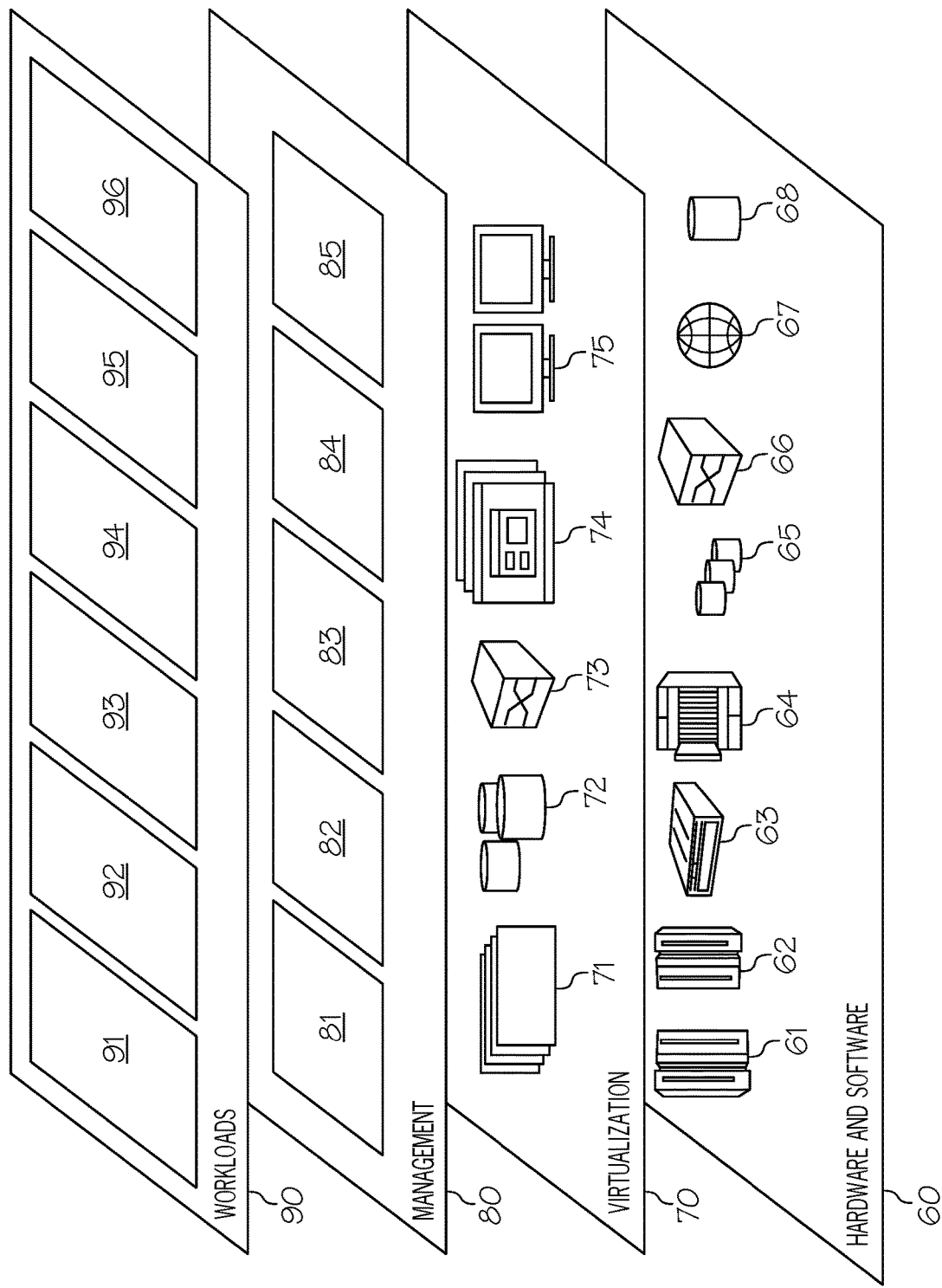
FIG. 8 illustrates abstraction model layers of a cloud computer environment according to one or more embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and machine learning system optimization and utilization processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of optimizing machine learning systems, the method comprising:
   training, by a computing device, a plurality of machine learning systems based on applying an initial labeled instance of data from an annotator;
   accessing, by the computing device, a committee of classifiers, wherein the committee of classifiers is composed of the plurality of machine learning systems;
   comparing, by the computing device, an attributes ranking of the initial labeled instance of the data from the annotator to attributes rankings that are generated by and used by each of the machine learning systems, wherein the comparing is performed upon evaluating one or more instances of unlabeled data that include the attributes, and wherein the attributes ranking of the initial labeled instance of the data comprises information indicative of a level of feature contributions for the instance of the data, and wherein the feature contributions describe an assessment by the annotator of how important a feature is to a prediction for a given instance of the data and to what direction, whether negative or positive contribution;
   inputting, by the computing device, one or more subsequent instances of unlabeled data into the plurality of machine learning systems to generate subsequent prediction labels for the one or more subsequent instances of unlabeled data, wherein the unlabeled data comprises the attributes of the data found in the initial labeled instance of data and new values of the attributes;
   further training, by the computing device, the plurality of machine learning systems until an accuracy of the committee of classifiers reaches a defined threshold, wherein the further training comprises applying the subsequent prediction labels;
   assigning, by the computing device, prediction labels to incoming unlabeled instances of data using the committee of classifiers that has reached the defined threshold; and
   calculating, by the computing device, a level of disparity among the committee of classifiers when evaluating the one or more subsequent instances of unlabeled data, wherein the disparity is based on differences in the subsequent prediction labels and differences in confidence in the subsequent prediction labels.

2. The method of claim 1, further comprising:
   weighting, by the computing device, the machine learning systems according to how closely each of the attributes rankings generated by and used by each of the machine learning systems match the attributes ranking from the annotator, wherein the weighting defines weighted machine learning systems; and
   updating, by the computing device, the committee of classifiers with the weighted machine learning systems.

3. The method of claim 1, wherein the initial labeled instance of data comprises attributes of the data, initial values of the attributes, and an initial prediction label that describes an initial predicted state based on the values.

4. The method of claim 1, wherein the reaching the defined threshold defines the committee of classifiers as being trained and optimized to accurately generate prediction labels for future unlabeled incidents of data that have the attributes of the initial incident of data.

5. The method of claim 1, further comprising:
   repeating, by the computing device, the receiving, comparing, weighting, inputting, and utilizing using annotator-labeled versions of the one or more subsequent instances of data until the accuracy of the committee of classifiers reaches the defined threshold.

6. The method of claim 1, further comprising:
   identifying, by the computing device, a maximum disparity data instance of unlabeled data from the one or more subsequent instances of unlabeled data that creates a maximum disparity in the prediction labels and confidences in the prediction labels by the committee of classifiers, wherein the confidences are threshold values;
   generating, by the computing device, a new training instance of data using the maximum disparity data instance and a new label for the maximum disparity data instance from the annotator; and
   further optimizing, by the computing device, the plurality of machine learning systems with the new training instance of data.

7. The method of claim 6, wherein the level of disparity is further based on differences in the confidences in the subsequent prediction labels by the committee of classifiers.

8. The method of claim 1, wherein at least one of the incoming unlabeled instances of data describe features of a particular physical device, and wherein the method further comprises:
   generating, by the computing device, a label for the at least one of the incoming unlabeled instances of data, wherein the label predicts a deleterious condition in the particular physical device; and
   modifying the particular physical device based on the deleterious condition identified by the label for the at least one of the incoming unlabeled instances of data, wherein modifying the particular physical device overcomes the deleterious condition in the physical device.

9. The method of claim 8, wherein the particular physical device is a computing system.

10. The method of claim 8, wherein the particular physical device is a unit of industrial equipment.

11. The method of claim 1, wherein the plurality of machine learning systems are trained by a neural network.

12. A computer program product comprising a computer readable storage medium having program code embodied therewith, wherein the computer readable storage medium is not a transitory signal per se, wherein the program code is readable and executable by a processor to perform a method of optimizing a machine learning system using semi-supervised learning, and wherein the method comprises:
   training a plurality of machine learning systems based on applying an initial labeled instance of data from an annotator;
   accessing a committee of classifiers, wherein the committee of classifiers is composed of the plurality of machine learning systems that have been trained using an initial labeled instance of data from an annotator, and wherein the initial labeled instance of data comprises attributes of the data, initial values of the attributes, and an initial prediction label that describes an initial predicted state based on the values;
   comparing an attributes ranking of the initial labeled instance of the data from the annotator to attributes rankings that are generated and used by each of the machine learning systems, wherein the comparing is performed upon evaluating one or more instances of unlabeled data that include the attributes, and wherein the attributes ranking of the initial labeled instance of the data comprises information indicative of a level of feature contributions for the instance of the data, and wherein the feature contributions describe an assessment by the annotator of how important a feature is to a prediction for a given instance of the data and to what direction, whether negative or positive contribution;

weighting the machine learning systems according to how closely each of the attributes rankings generated by and used by each of the machine learning systems match the attributes ranking from the annotator, wherein the weighting defines weighted machine learning systems;

inputting one or more subsequent instances of unlabeled data into the weighted machine learning systems to generate subsequent prediction labels for the one or more subsequent instances of unlabeled data, wherein the unlabeled data comprises the attributes of the data found in the initial labeled instance of data and new values of the attributes;

further training the plurality of machine learning systems until an accuracy of the committee of classifiers reaches a defined threshold, wherein the further training comprises applying the subsequent prediction labels, and wherein reaching the defined threshold defines the committee of classifiers as being trained to accurately generate prediction labels for future unlabeled incidents of data that have the attributes of the initial incident of data;

assigning prediction labels to incoming unlabeled instances of data using the committee of classifiers that has reached the defined threshold; and calculating, by the computing device, a level of disparity among the committee of classifiers when evaluating the one or more subsequent instances of unlabeled data, wherein the disparity is based on both differences in the subsequent prediction labels and differences in confidence in the subsequent prediction labels.

13. The computer program product of claim 12, wherein the method further comprises:

repeating the receiving, comparing, weighting, inputting, and further training using annotator-labeled versions of the one or more subsequent instances of data until the accuracy of the committee of classifiers reaches the defined threshold.

14. The computer program product of claim 12, wherein the method further comprises:

calculating a level of disparity among the committee of classifiers when evaluating the one or more subsequent instances of unlabeled data, wherein the disparity is based on differences in the subsequent prediction labels;

identifying a maximum disparity data instance of unlabeled data from the one or more subsequent instances of unlabeled data that creates a maximum disparity in the prediction labels and confidences in the prediction labels by the committee of classifiers, wherein the confidences are threshold values;

generating a new training instance of data using the maximum disparity data instance and a new label for the maximum disparity data instance from the annotator; and further optimizing the plurality of machine learning systems with the new training instance of data.

15. The computer program product of claim 13, wherein at least one of the incoming unlabeled instances of data describe features of a particular physical device, and wherein the method further comprises:

generating a label for the at least one of the incoming unlabeled instances of data, wherein the label predicts a deleterious condition in the particular physical device; and modifying the particular physical device based on the deleterious condition identified by the label for the at least one of the incoming unlabeled instances of data, wherein modifying the particular physical device overcomes the deleterious condition in the physical device.

16. The computer program product of claim 12, wherein the plurality of machine learning systems are trained by a neural network.

17. The computer program product of claim 12, wherein the program code is provided as a service in a cloud environment.

18. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:

training a plurality of machine learning systems based on applying an initial labeled instance of data from an annotator;

accessing a committee of classifiers, wherein the committee of classifiers is composed of the plurality of machine learning systems that have been trained using an initial labeled instance of data from an annotator, and wherein the initial labeled instance of data comprises attributes of the data, initial values of the attributes, and an initial prediction label that describes an initial predicted state based on the values;

receiving an attributes ranking of the initial labeled instance of the data from the annotator, wherein the attributes ranking is based on a determination by the annotator of an impact level that each attribute has when generating a prediction label for an instance of data that has the attributes of the initial labeled instance of data;

comparing the attributes ranking from the annotator to attributes rankings that are generated and used by each of the machine learning systems, wherein the comparing is performed upon evaluating one or more instances of unlabeled data that include the attributes;

weighting the machine learning systems according to how closely each of the attributes rankings generated by and used by each of the machine learning systems match the attributes ranking from the annotator, wherein the weighting defines weighted machine learning systems;

inputting one or more subsequent instances of unlabeled data into the weighted machine learning systems to generate subsequent prediction labels for the one or more subsequent instances of unlabeled data, wherein the unlabeled data comprises the attributes of the data found in the initial labeled instance of data and new values of the attributes;

further training the plurality of machine learning systems until an accuracy of the committee of classifiers reaches a defined threshold, wherein the further training comprises applying the subsequent prediction labels, and wherein reaching the defined threshold defines the committee of classifiers as being trained to accurately generate prediction labels for future unlabeled incidents of data that have the attributes of the initial incident of data;

assigning prediction labels to incoming unlabeled instances of data using the committee of classifiers that has reached the defined threshold; and calculating, by the computing device, a level of disparity among the committee of classifiers when evaluating the one or more subsequent instances of unlabeled data, wherein the disparity is based on differences in the subsequent prediction labels and differences in confidence in the subsequent prediction labels.

19. The computer system of claim 18, wherein the stored program instructions are provided as a service in a cloud environment.

* * * * *